July 10, 1951            H. JENSEN            2,559,963

BEARING SEAL

Filed Oct. 15, 1945                                           3 Sheets-Sheet 1

INVENTOR.
HANS JENSEN
BY Harry H. Hitzeman
ATTORNEY.

July 10, 1951  H. JENSEN  2,559,963
BEARING SEAL

Filed Oct. 15, 1945  3 Sheets-Sheet 2

INVENTOR.
HANS JENSEN
BY
Harry H. Hitzeman
ATTORNEY.

July 10, 1951  H. JENSEN  2,559,963
BEARING SEAL

Filed Oct. 15, 1945  3 Sheets-Sheet 3

INVENTOR.
HANS JENSEN
BY
ATTORNEY.

Patented July 10, 1951

2,559,963

UNITED STATES PATENT OFFICE 2,559,963

BEARING SEAL

Hans Jensen, Arlington Heights, Ill., assignor, by mesne assignments, to Rotary Seal Company, Chicago, Ill., a corporation of Illinois Application October 15, 1945, Serial No. 622,443

1 Claim. (Cl. 286—11)

My invention relates to bearing seals and similar devices.

My invention relates more particularly to sealing devices or sealing means adapted to form a fluid seal between two relatively rotating parts.

Bearing seals of the type which I am about to describe are particularly useful in automotive fluid circulating pumps, refrigerator driving units and a large variety of other mechanisms wherein the housing, through which a shaft is directed, may contain a fluid which must of necessity be prevented from escaping about the rotating shaft which extends through the housing. While a large number of various constructions of bearing seals have been proposed for the purposes described, such constructions have not generally been entirely satisfactory. In some of the most popular types of bearing seals the bearing nose or seal member is usually carried by a housing that is connected directly to a rotating shaft by means of a diaphragm, bellows or other flexible connector which is securely fastened to the shaft and to the bearing nose housing, so that the force of rotating the seal against the bearing surface must of necessity be conveyed through the flexible member of the ensemble. This, together with the other strains on this member, naturally tends to weaken this particular element of the assembly and greatly reduces the life of a bearing seal constructed in this general manner.

In the preferred embodiment of my invention, the principal object is to provide an improved bearing seal of a type wherein the flexible member which thrusts the bearing nose against a bearing surface under resilient pressure is carried by a flange sleeve that is fixedly secured to the mechanism surrounding the shaft so that the only strain upon the flexible member is that which is imparted by the longitudinal movement of the shaft.

A further object of the present invention is to provide a bearing seal of the type described that can be readily secured in position or removed from an installation without disturbing the shaft, the bearing in which the shaft rotates, or other associated parts.

A further object of the invention is to provide an improved structure of bearing seal capable of being used either as a stationary seal in certain installations, yet adaptable to be used as a rotating seal applied either on the inside or the outside of the housing of a mechanism through which the shaft extends.

A further object of the invention is to provide a bearing seal assembly of the type described that is comparatively simple in construction yet capable of long and hard usage without becoming broken or out of order.

A further object of the invention is to provide a construction wherein the drive between the rotating shaft and the bearing seal, when the same is mounted for rotation with the shaft, is a positive mechanical connection, so arranged, however, that the bearing nose is capable of longitudinal movement on the shaft and is provided with means for effecting a continuous yieldable pressure of the same against a bearing surface.

Other objects and advantages will be more apparent from the following description wherein reference is had to the accompanying three sheets of drawings, upon which Fig. 1 is a vertical sectional view through a compressor or other pump mechanism housing showing a rotating shaft extending from the housing, with my improved bearing seal mounted in operative position thereon;

Figure 1:
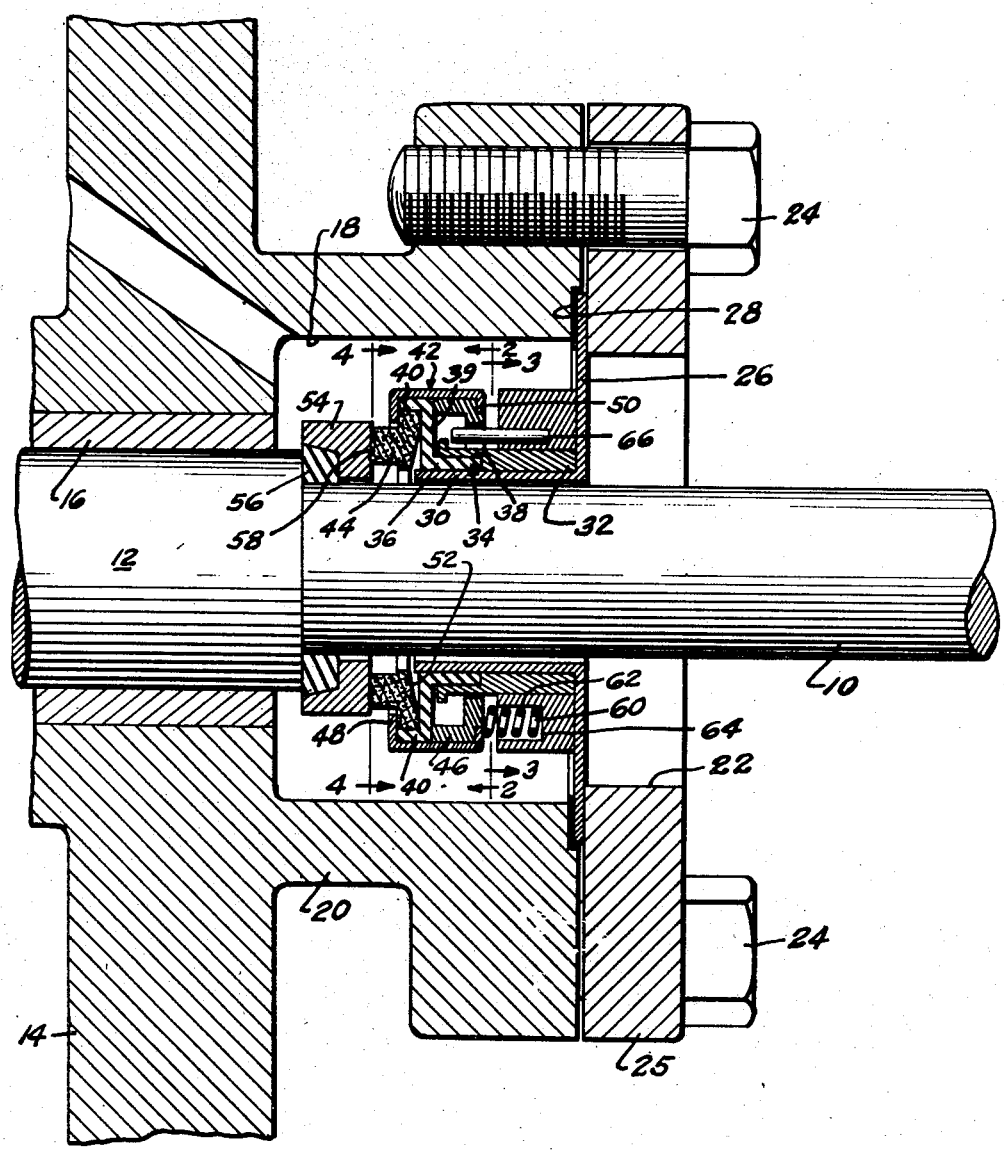
Figure 2:
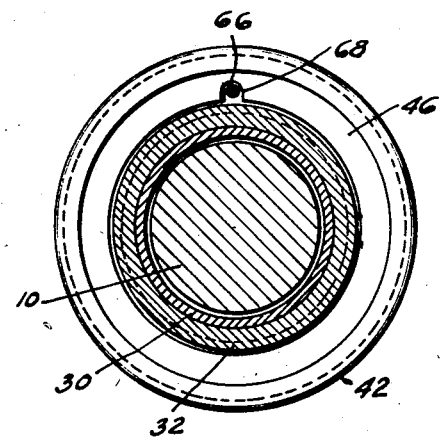
Fig. 2 is a vertical cross-sectional view of the bearing seal and shaft taken generally on the lines 2—2 of Fig. 1.
Figure 3:
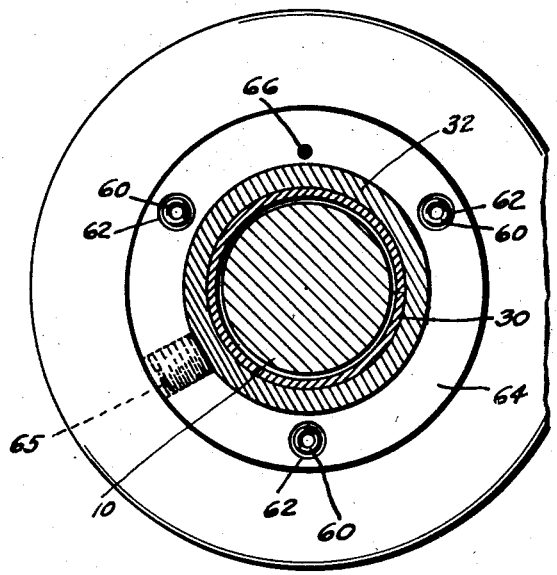
Fig. 3 is a similar cross-sectional view of the same, except looking in the opposite direction from Fig. 2.
Figure 4:
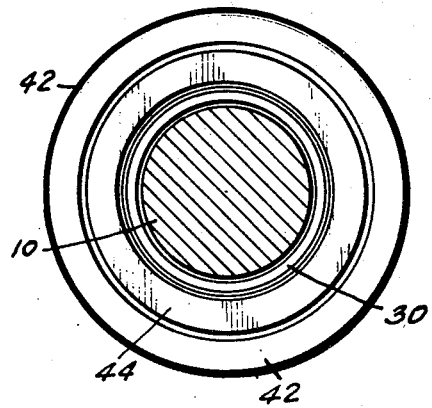
Fig. 4 is a similar cross-sectional view of the same elements taken generally on the line 4—4 of Fig. 1.
Figure 5:
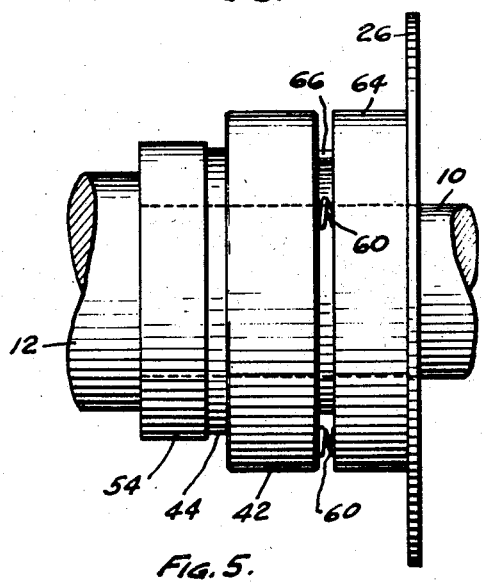
Fig. 5 is a side elevational view of the bearing seal shown mounted upon a shaft.

In the embodiment of the invention which I have chosen to illustrate, I have shown a rotatable shaft 10 which has an enlarged portion 12 that extends through the vertical wall 14 of a housing within which fluid under pressure may be present, the shaft being mounted in a suitable bearing 16 in the housing wall. The shaft may extend through an enlarged opening 18 in the portion 20 of the wall 14, and through an opening 22 in a cover plate 25 that is positioned over the opening, being secured thereto by suitable bolt members 24.

My improved bearing seal is mounted in an operative position in the opening 18 by means of the flange sleeve 26, which is held in position by the bolts 24 against a gasket member 28.

The flange sleeve 26 may have a tubular portion 30 telescopically mounted over the shaft 10 and adapted to cooperate with the diaphragm sleeve 32 to fixedly secure the flexible diaphragm 34 in operative position. The portion 36 of the diaphragm may be slightly compressed and positioned between the portion 30 of the flange sleeve and the portion 38 of the diaphragm sleeve. The diaphragm may be formed with the lateral flange 39 and forwardly extending lip 40 and is adapted to be fixedly secured in the retaining shell 42 holding the bearing nose 44 fixedly in position by means of a spacer member 46. The bearing nose, diaphragm and spacer are adapted in assembly to be placed within the retaining shell against its forward wall 49 so that the back edge 50 may be curled down to complete the assembly.

The bearing nose 44 which may be in the shape of an annular ring, has an inclined wall 52 so that there is a slight amount of lateral motion permitted between the outer edge of the same and the flexible diaphragm.

In the embodiment shown in Fig. 1 I provide a shoulder seal ring 54 which carries a packing ring 56 of a diameter smaller than the shaft 10, the packing being formed of a rubber or similar resilient material so that the seal ring can be frictionally positioned upon the shaft and rotate with the same. The shoulder seal ring is preferably formed with a lapped face 58 so that the engagement between the bearing nose and the seal ring will prevent any leakage across the face of the same.

The bearing nose 44 is held by a yielding pressure against the face of the seal ring continuously. This is accomplished by means of a plurality of spring members 60 which are positioned in suitable pockets 62 in a collar member 64 that is fastened to the diaphragm sleeve 32. Any securing means may be used for this purpose, and in the drawing I have shown a screw-threaded plug 65 which frictionally engages the diaphragm sleeve 32.

Means for preventing the rotation of the diaphragm 36 due to the friction between the shoulder seal ring and the bearing nose are provided and may comprise one or more pin members 66 which extend from the collar 64 into an aperture 68 in the spacer member 46, which forms part of the retaining shell assembly.

With the construction which I have provided, it can be seen that when the bearing seal is placed in operative position in the aperture 18 of the housing, the bearing nose 44 will be positioned under spring pressure against the sealing ring 54. As the shaft 10 rotates carrying with it the shoulder seal ring, an effective seal between the stationary nose and the shoulder sealing ring is thus provided. By reason of the pin 66, any rotary thrust upon the diaphragm 36 is practically eliminated, thus tending to insure longer wear for this flexible member. Due to the connection between the stationary flange and the retaining shell, limited longitudinal movement of the bearing nose and associated parts is possible in cooperation with the movement of the shaft 10.

Figure 6:
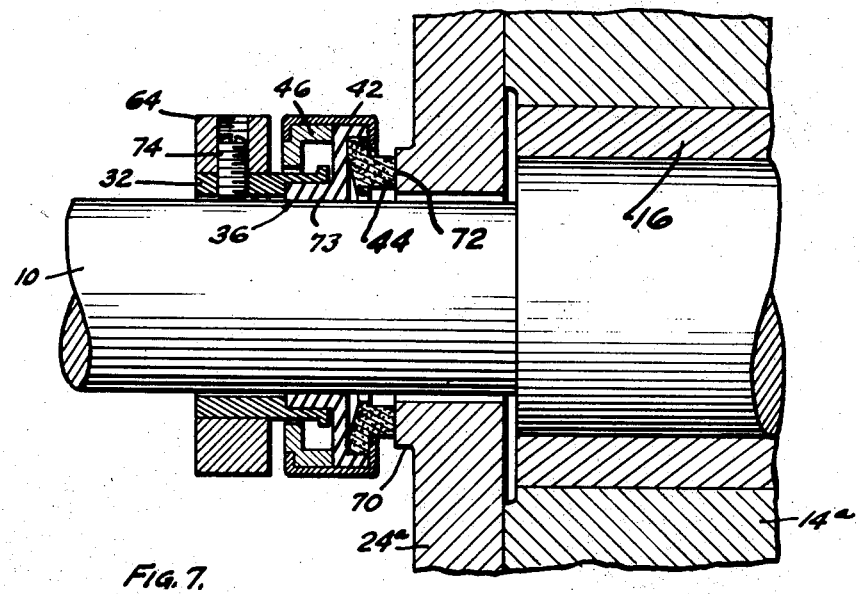
Fig. 6 is a vertical cross-sectional view of a housing from which a shaft is extended, showing my improved bearing seal mounted upon the outside of the housing for rotation with the shaft.

In Fig. 6 I have shown a modified form of the invention wherein the shaft 10 may extend through a cover plate 24a positioned against the wall of a compressor or other housing 14a. In this construction the cover plate may be provided with a boss 70 having a lapped surface 72 against which the bearing nose 44 is resiliently held. It will further be noted that the cylindrical portion 73 of the diaphragm 36 is frictionally mounted upon the shaft 10, this portion of the diaphragm being smaller than the shaft so that it is stretched when placed in position and is thus frictionally retained on the shaft. This effectively prevents the passage of any fluid along the shaft at this point. In this construction I effect a mechanical drive for the purpose of rotating the bearing seal with the shaft by providing a stud 74 which is positioned in a tapped opening in the collar 64 and diaphragm sleeve 32, passing through the same and engaging the surface of the shaft 10.

With the bearing seal mounted in this position upon the shaft, and with the spring members 60 compressed and tending to press the bearing nose 44 against the lapped surface 72 of the boss 70, the bearing seal will rotate with the shaft and maintain an absolute fluid seal both at the bearing nose and also at the diaphragm, in view of the fact that the diaphragm itself provides no mechanical connection for rotating the bearing seal with the shaft, thus acting at this point in effect only as a sealing agent.

Figure 7:
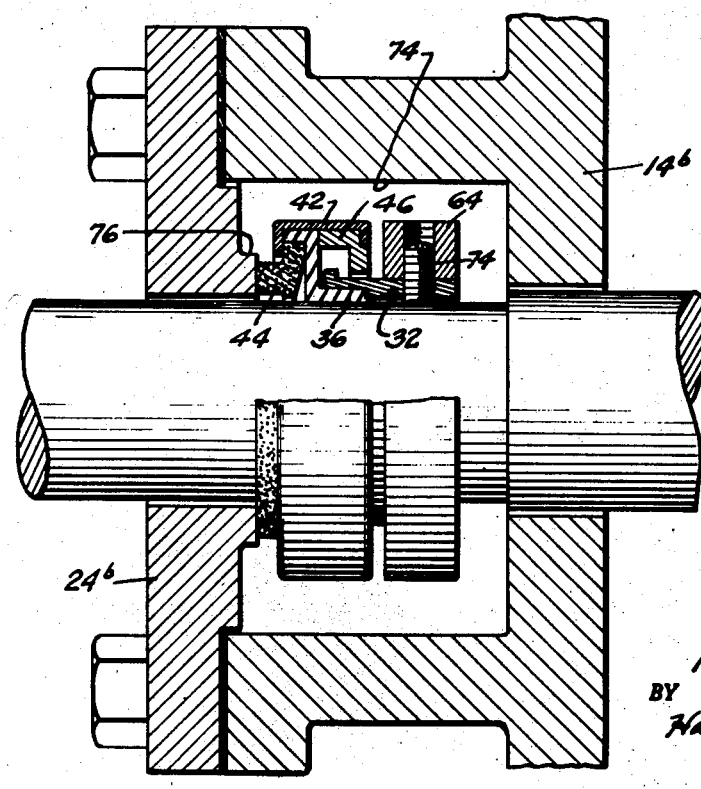
Fig. 7 is a similar cross-sectional view of a compressor or other housing showing my improved bearing seal mounted in position on the shaft to rotate with the same.

In Fig. 7 I have shown a modified arrangement for using the same bearing seal on the inside of a cover plate in mechanisms where the opening 74 is provided in the housing 14b. The assembly and method of mounting the bearing seal are identical to that shown in Fig. 6, with the bearing seal nose 44, however, engaging an inner boss 76 on the cover plate 24b. It is preferable that the face of the boss be finished and lapped in the same manner described in the installation shown in Fig. 6.

From the above and foregoing description it can be seen that I have provided a comparatively simple bearing seal capable of various types of installation. By the use of the flange sleeve shown in Fig. 1 the seal may be fixedly positioned and operate to effect a seal against a sealing ring mounted on a rotary shaft. In the construction shown in Figs. 6 and 7, the sealing ring 54 and the flange sleeve 26 are eliminated, the bearing seal being fixedly mounted on the shaft by a mechanical connection, and the bearing nose acting against the lapped surface of a boss on the cover plate.

It will be obvious from the foregoing description that the installation or removal of these seals is a comparatively simple matter in any one of the three installations which have been shown. Also, due to the mechanical drive connection which protects the diaphragm, the only wear to which the same is subjected is the back and forth movement longitudinally of the shaft, thus insuring a much longer life for this element, which in most bearing seals is the first element to become worn out or broken.

While I have illustrated and described a specific embodiment of the invention, it will be apparent to those skilled in the art that changes and modifications may be made in the exact details shown, and I do not wish to limit myself in any particular; rather what I desire to secure and protect by Letters Patent of the United States is:

A shaft seal for a rotating shaft member and a cooperating sleeve member in which it extends, wherein one of said members forms a seal seat, said shaft seal comprising a seal ring formed to encircle the shaft and to make running contact with said seal seat, a flexible diaphragm of resilient rubber-like material comprising a radial flange, a central sleeve-like portion providing an opening through which the shaft may extend, and a peripheral portion extending at and embracing the outer peripheral edge of the seal ring, a retaining shell clampingly securing the peripheral portions of said seal ring and diaphragm, mounting means secured on the other of said members and formed to encircle the shaft member and to clampingly engage the central sleeve-like portions of said diaphragm to secure the same upon said other member, a spline pin mounted on and projecting from said mounting means and extending in position for splined engagement with said retaining shell for preventing relative rotation of said seal ring with respect to said mounting means, and spring means bearing in opposite directions on said shell and mounting means to urge the seal ring in a direction to engage with the seal seat.

HANS JENSEN.

REFERENCES CITED

The following references are of record in the file of this patent:

UNITED STATES PATENTS

| Number | Name | Date |
|---|---|---|
| 1,170,450 | Lachmann | Feb. 1, 1916 |
| 1,795,546 | Evans | Mar. 10, 1931 |
| 1,803,510 | Schmieding | May 5, 1931 |
| 1,878,804 | Baker et al. | Sept. 20, 1932 |
| 2,030,303 | Kempton | Feb. 11, 1936 |
| 2,100,220 | King | Nov. 23, 1937 |
| 2,365,351 | Matter | Dec. 19, 1944 |
| 2,373,463 | Curtis | Apr. 10, 1945 |
| 2,385,420 | Meyer | Sept. 25, 1945 |
| 2,432,694 | Snyder | Dec. 16, 1947 |